United States Patent Office 3,010,477
Patented Nov. 28, 1961

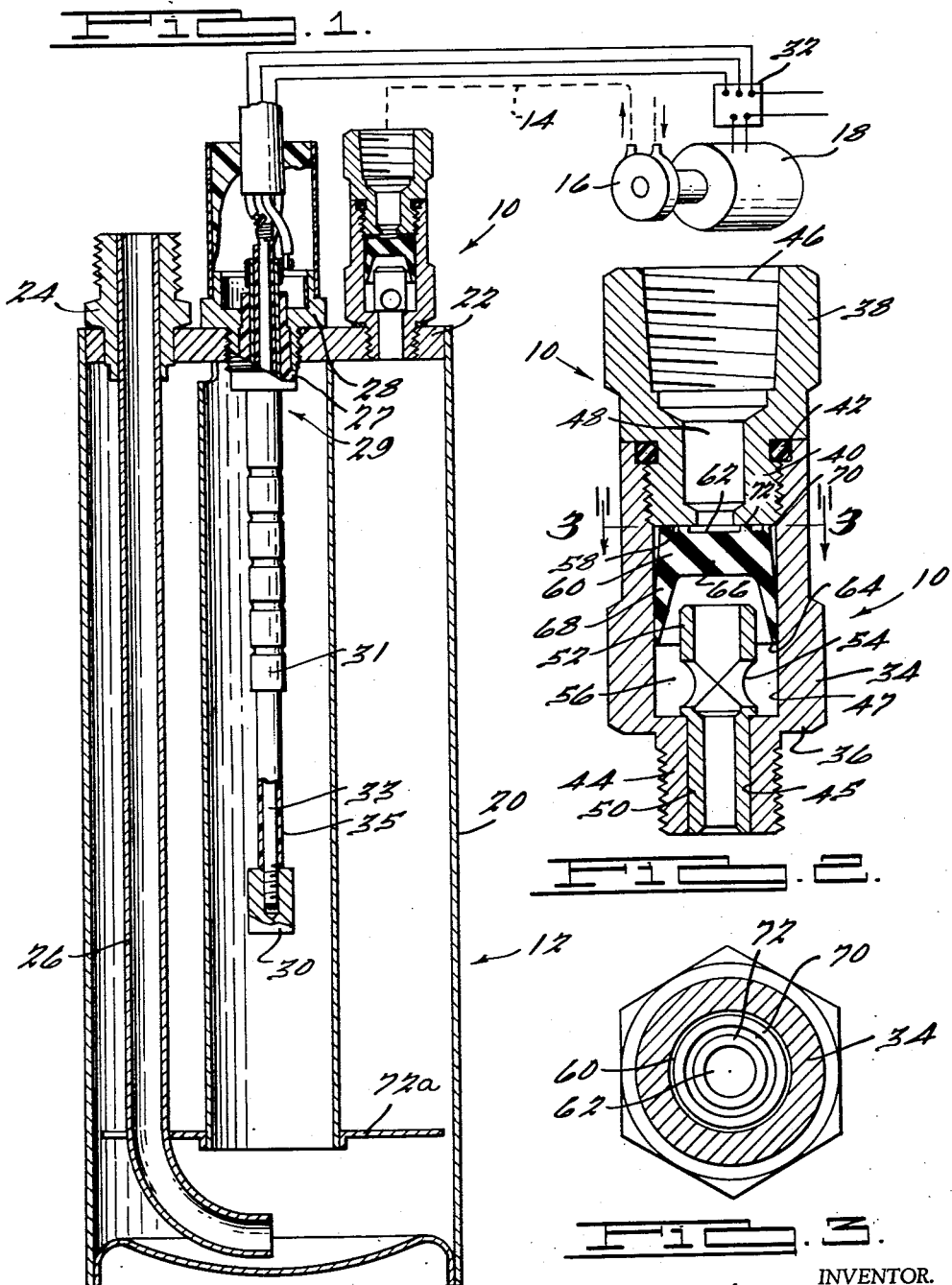

3,010,477
CHECK VALVE UNIT
Frank O. Graham, Detroit, Mich., assignor to Temprite Products Corporation, a corporation of Michigan
Filed Sept. 8, 1958, Ser. No. 759,576
1 Claim. (Cl. 137—516.25)

This invention relates generally to carbonating apparatus suitable for charging beverages and water with $CO_2$ gas and more particularly to a check valve unit in such apparatus for preventing any backup of the carbonated fluid into the water supply system.

A check valve must be inserted in the water supply line at the entrance to a carbonator to prevent any back flow of carbonated water with resultant corrosion of the water supply pipes and danger to health. The principal object of this invention, therefore, is to provide, in combination with a carbonator, a double-acting check valve unit which has a pair of sealing portions, either one of which is effective to prevent any back flow of carbonated water into the water supply system. Furthermore, one of the sealing portions is provided with at least one sealing ring which engages a valve seat on the valve unit at a high pressure to insure the required seal between the ring and the seat. The other sealing portion consists of a resilient annular wall which is slidably supported on and positioned within a tubular portion of the valve body so as to also wipe the body portion and prevent any accumulation of lime deposits thereon. By virtue of its resiliency, the annular wall is capable of wrapping itself partially around a dirt or other foreign particle on the tubular body so as to maintain the required seal between the wall and the body even when such a particle is present.

A further object of this invention is to provide a check valve unit for carbonating apparatus which is simple in construction, economical to manufacture, and efficient and safe in operation in providing a positive block for preventing any backup of carbonated water into the water supply system.

Further objects, features and advantages of this invention will become apparent from a consideration of the following description, the appended claim and the accompanying drawing in which:

FIGURE 1 is a composite view showing a carbonator in vertical section and showing the water supply means for the carbonator in diagrammatic form, and illustrating the check valve unit of this invention in assembly relation with the carbonator;

FIGURE 2 is a longitudinal sectional view of the check valve unit of this invention; and FIGURE 3 is a transverse sectional view looking along the line 3—3 in FIG. 2.

With reference to the drawing, the check valve unit of this invention, indicated generally at 10, is illustrated in FIGURE 1 in assembly relation with a carbonator 12 adapted to be connected to a water supply line 14 which communicates with a pump 16 driven by an electric motor 18. The carbonator 12, which is described in detail in Patent No. 2,798,135, owned by the assignee of this invention, includes a hermetically tight tank or shell 20 having a top wall or closure plate 22 which supports a fitting 24 for a carbonated water discharge tube 26. The top wall 22 also carries a support fitting 28 for an insulating tube 27, and liquid level control apparatus, indicated generally by the numeral 29, is mounted in and extends downwardly from the tube 27. The apparatus 29 consists of a tubular electrode 31 and a rod-shaped electrode 33 of greater length than electrode 31. Electrode 33 is fitted with a tubular insulating sheath 35 of flexible plastic material, the sheath being of a diameter to fit the inner wall of the tubular electrode 31 and support the rod electrode in coaxial relation to the tubular electrode. The lower end of rod electrode 33 extends below the lower end of the sheath 35 and is threaded to receive an enlarged tip 30 of carbon or graphite. The electrodes 31 and 33 are connected to a relay 32 which is in turn connected to the pump motor 18 for starting and stopping the motor 18 to maintain a liquid level in the carbonator 12 which is between the lower ends of the electrodes 31 and 33.

The top wall 22 also supports a $CO_2$ gas inlet fitting (not shown) adapted to be connected to a source of $CO_2$ gas through suitable pressure control devices in a manner well known in the carbonator art. This fitting may conveniently be identical to the check valve unit 10 which is effective to positively prevent back flow of $CO_2$ gas.

The check valve unit 10 includes a tubular body 34 formed in two parts, a lower part 36 and an upper part 38 which has a lower end portion 40 that is threaded into the upper end portion of the part 36 so as to compress an O-ring 42 therebetween and maintain the parts 36 and 38 in a fluid-tight relationship. The lower part 36 has a reduced diameter externally threaded outlet portion 44 at its lower end which is supported in the carbonator top plate 22. The part 36 is provided with a first end bore 45 which extends through the outlet portion 44 and a second larger bore 47 which extends through the main portion of the part 36 and communicates with the bore 45. The upper part 38 has an internally threaded inlet end 46 which is connected to the supply line 14 and communicates with a reduced diameter inlet passage 48 which extends axially of the upper part 38 at a position within the threaded lower end portion 40.

A tubular nozzle member 50 is press-fitted in the bore 45 and has an enlarged upwardly projecting extension 52 which is positioned within the bore 47 and provided with transversely extending inlet openings 54.

A valve member 60, of inverted cup shape, is positioned within the body 34 in a chamber 56 formed by the bore 47 and extending between the bore 45 and the lower end surface 58 of the upper part 38 which, as will appear hereinafter, functions as a valve seat. The valve member 60 has a substantially disk shape base 66 and a depending annular wall 68 which tapers downwardly and is of a diameter at its lower end 64 corresponding substantially to the diameter of the chamber 56. The taper of the wall 68 is such that at its lower end 64 it has substantially no thickness. The base 66 is of a diameter slightly less than the diameter of the chamber 56 and has its outer edge tapered so that it conforms to the taper of the wall 68.

One side 62 of the base 66 is arranged in an opposing relation to the valve seat 58 and is formed with a pair of sealing rings 70 and 72, of a substantially half O-shape in cross section. The rings 70 and 72 are concentric with the axis of the valve member 60 and of a diameter to extend around the inlet passage 48 when the rings 70 and 72 are positioned in sealing engagement with the valve seat 58. The valve member 60 is molded from a resilient material such as Buna-N, natural rubber, neophrene or polyethylene.

The valve unit 10 is assembled with the carbonator so that water delivered to the valve unit 10 is introduced under pressure into the carbonator 12 in the form of a solid stream or jet directed toward a baffle plate 72a in the carbonator tank 20. In the use of the carbonator, the $CO_2$ gas inlet fitting is connected with a source of gas under pressure and the pump 16 is connected to a water supply line adapted to supply water under pressure to the unit 10. When the liquid level in the tank 20 falls below the electrode tip 30 the pump 16 operates to deliver water at the pump discharge pressure to the unit 10 so that the water in the inlet passage 48 is at a pressure exceeding the pressure in the chamber 56. As a result, the valve member 60 is moved in a direction toward the nozzle extension 52 to thereby move the sealing rings 70 and 72 off the valve seat 58. Movement of the valve member 60 in this direction is limited by engagement of the base 66 with the nozzle extension 52. The side wall 68 of the valve member 60 deflects inwardly to allow water to travel around the valve member into the chamber 56 and through the openings 54 in the nozzle extension 52 for discharge out of the unit 10 through the nozzle 50.

The water is discharged from nozzle 50 in the form of a solid jet which is projected into the body of liquid in the carbonator at high velocity and causes the liquid to vigorously boil and bubble in the presence of the compressed gas which is maintained under the predetermined supply pressure. When the liquid level rises to the level of the lower end of electrode tube 31, the pump 16 is shut off so that the pressure in the inlet passage 48 falls to a pressure below the pressure in the chamber 56. The valve member 60 is moved by this pressure differential in an opposite direction to a position in which the rings 70 and 72 engage the valve seat 58 and the annular wall 68 is in pressure engagement with the body 34, especially at the lower end 64 of the valve member 60.

By virtue of the fact that the sealing rings 70 and 72 are of a reduced area, in a plane extending diametrically of the chamber 56, relative to the area of base 66, the unit sealing pressure exerted by the rings 70 and 72 on the seat 58 tending to hold them in engagement with the seat 58 is increased relative to the unit pressure which would be exerted by the base without the rings. The tapered shape of the annular wall 68 so that at its lower end 64 it has substantially no thickness facilitates both deflection of the wall 68 and pressure engagement with the wall end 64 with the wall of the chamber 56. As a result, the wall 68 is capable of actually deflecting to an extent such that it will seal around a dirt or other foreign particle which may become lodged between the wall 68 and the chamber wall so that no water will leak past the particle. Furthermore, the end 64 of the wall 68 wipes against the chamber wall during back and forth movement of the valve member 60 so as to prevent any buildup of lime deposits on the chamber wall. The valve body 60 thus acts at both the rings 70 and 72 which engage the seat 58 and the wall 68 which engages the chamber wall to positively prevent any back flow of carbonated fluid into the line 14 and in effect provide a double check valve action in the single unit 10.

It will be understood that the specific construction of the improved check valve unit which is herein disclosed and described is presented for purposes of explanation and illustration and is not intended to indicate limits of the invention, the scope of which is defined by the following claim.

What is claimed is:

A double sealing check valve unit for a carbonator apparatus adapted to be supplied with water and $CO_2$ gas, comprising: a valve body having a cylindrical valve chamber therein, said valve chamber being of circular cross-section and having imperforate side walls; inlet and outlet passageways in said valve body communicating with said valve chamber; a valve seat surrounding said inlet passageway in said valve chamber; a tubular member surrounding said outlet passageway and projecting into said valve chamber, said tubular member being of a diameter substantially less than the diameter of said valve chamber and having a transverse opening therethrough communicating said valve chamber with said outlet passageway; a cup-shaped valve member formed of a resilient material and positioned in said valve chamber, said valve member having at one end a base arranged in an opposing relation to said valve seat and having first sealing means thereon adapted to engage said valve seat to sealingly close said inlet passageway when said valve member is urged toward said valve seat by pressure in said valve chamber, and at the other end second sealing means in the form of a tapered annular wall extending toward said tubular member in coaxial relationship therewith, said annular wall being of a diameter corresponding substantially to the diameter of said chamber and having the terminal end thereof disposed in wiping and sealing engagement with the imperforate wall of said valve chamber, the axial length of said annular wall being less than the distance between the projecting end of said tubular member and a portion of the transverse opening therein, whereby when said valve member is urged toward said outlet passageway by pressure in said inlet passageway fluid may flow from said inlet passageway past said first and second sealing means and through said transverse opening into said outlet passageway.

References Cited in the file of this patent

UNITED STATES PATENTS

| 405,250 | Dudley | June 18, 1889 |
| 593,594 | Marea | Nov. 16, 1897 |
| 2,481,460 | Williams | Sept. 6, 1949 |
| 2,567,391 | Mead | Sept. 11, 1951 |
| 2,591,148 | Green | Apr. 1, 1952 |
| 2,603,951 | Ross | July 22, 1952 |
| 2,663,540 | Erickson | Dec. 22, 1953 |
| 2,815,041 | Rimsha et al. | Dec. 3, 1957 |

FOREIGN PATENTS

| 9,853 | Great Britain | of 1890 |
| 1,031,887 | France | Mar. 25, 1953 |
| 1,142,320 | France | Mar. 25, 1957 |